US012652649B2

(12) United States Patent
Zhang et al.

(10) Patent No.: US 12,652,649 B2
(45) Date of Patent: Jun. 9, 2026

(54) PROCESSING METHOD FOR RELAY UE AND USER EQUIPMENT

(71) Applicant: Sharp Kabushiki Kaisha, Sakai City (JP)

(72) Inventors: Chongming Zhang, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 361 days.

(21) Appl. No.: 18/031,643

(22) PCT Filed: Oct. 14, 2021

(86) PCT No.: PCT/CN2021/123809
§ 371 (c)(1),
(2) Date: Apr. 13, 2023

(87) PCT Pub. No.: WO2022/078447
PCT Pub. Date: Apr. 21, 2022

(65) Prior Publication Data
US 2023/0413231 A1      Dec. 21, 2023

(30) Foreign Application Priority Data
Oct. 16, 2020      (CN) .......................... 202011114699.6

(51) Int. Cl.
*H04W 68/02*          (2009.01)
*H04W 76/14*          (2018.01)
(Continued)

(52) U.S. Cl.
CPC ........... *H04W 68/02* (2013.01); *H04W 76/14* (2018.02); *H04W 76/27* (2018.02); *H04W 88/04* (2013.01)

(58) Field of Classification Search
CPC ..... H04W 68/02; H04W 76/14; H04W 76/27; H04W 88/04; H04W 68/00; H04W 92/18; H04B 7/155
(Continued)

(56) References Cited

U.S. PATENT DOCUMENTS

2020/0015192 A1*    1/2020   Chun .................... H04W 76/27
2020/0170075 A1     5/2020   Xu et al.
(Continued)

FOREIGN PATENT DOCUMENTS

WO          2018/137284 A1     8/2018
WO          2018/196066 A1     11/2018

OTHER PUBLICATIONS

Official Communication issued in International Patent Application No. PCT/CN2021/123809, mailed on Jan. 21, 2022.

*Primary Examiner* — Hirdepal Singh
(74) *Attorney, Agent, or Firm* — Keating & Bennett, LLP

(57)          ABSTRACT
Provided in the present invention are a processing method for a relay UE and user equipment. In the processing method for a relay UE, the relay UE serves a remote UE, and the processing method includes: the relay UE receiving a paging message transmitted from a base station, and confirming a UE identity in the received paging message; the relay UE obtaining a UE identity of the remote UE from an upper layer or an RRC layer of the relay UE; the relay UE determining whether the received paging message includes the UE identity of the remote UE; and if the paging message includes the UE identity of the remote UE, the relay UE generating a paging indication that includes the UE identity of the remote UE or indicates that the UE identity of the remote UE has been received.

3 Claims, 5 Drawing Sheets

(51) Int. Cl.
*H04W 76/27* (2018.01)
*H04W 88/04* (2009.01)

(58) Field of Classification Search
USPC .......................................................... 455/458
See application file for complete search history.

(56) References Cited

U.S. PATENT DOCUMENTS

| | | | | |
|---|---|---|---|---|
| 2021/0360742 | A1* | 11/2021 | Liao ...................... | H04W 60/00 |
| 2022/0061021 | A1* | 2/2022 | Wang ................... | H04L 1/0061 |
| 2023/0084017 | A1* | 3/2023 | Wang ................... | H04W 76/27 |
| | | | | 370/311 |

* cited by examiner

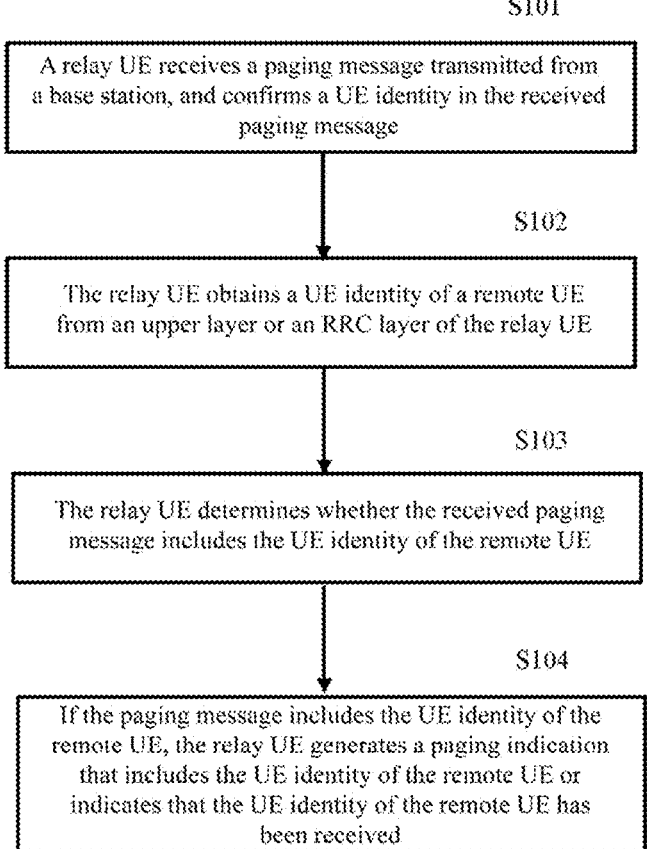

S101

A relay UE receives a paging message transmitted from
a base station, and confirms a UE identity in the received
paging message

S102

The relay UE obtains a UE identity of a remote UE
from an upper layer or an RRC layer of the relay UE

S103

The relay UE determines whether the received paging
message includes the UE identity of the remote UE

S104

If the paging message includes the UE identity of the
remote UE, the relay UE generates a paging indication
that includes the UE identity of the remote UE or
indicates that the UE identity of the remote UE has
been received

FIG. 1

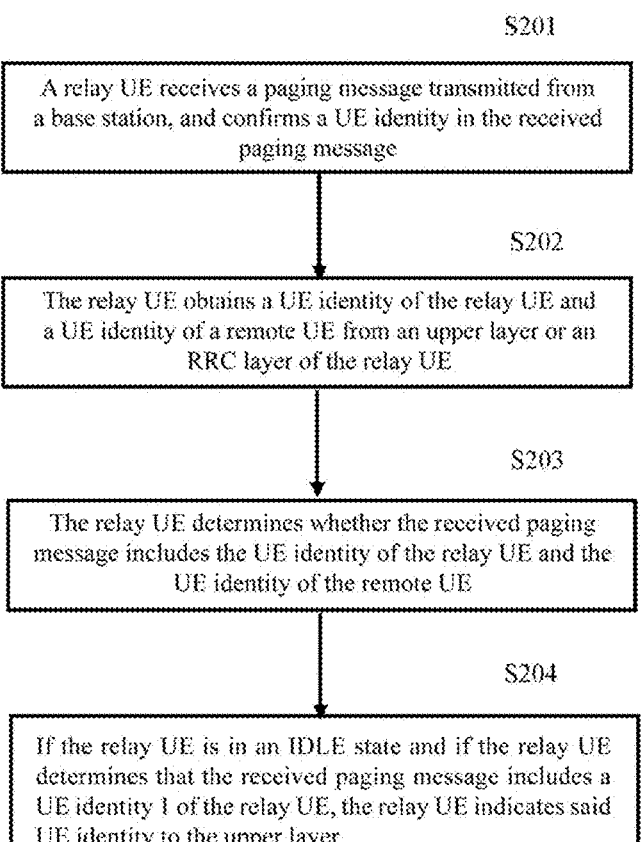

S201

A relay UE receives a paging message transmitted from a base station, and confirms a UE identity in the received paging message

S202

The relay UE obtains a UE identity of the relay UE and a UE identity of a remote UE from an upper layer or an RRC layer of the relay UE

S203

The relay UE determines whether the received paging message includes the UE identity of the relay UE and the UE identity of the remote UE

S204

If the relay UE is in an IDLE state and if the relay UE determines that the received paging message includes a UE identity 1 of the relay UE, the relay UE indicates said UE identity to the upper layer

FIG. 2

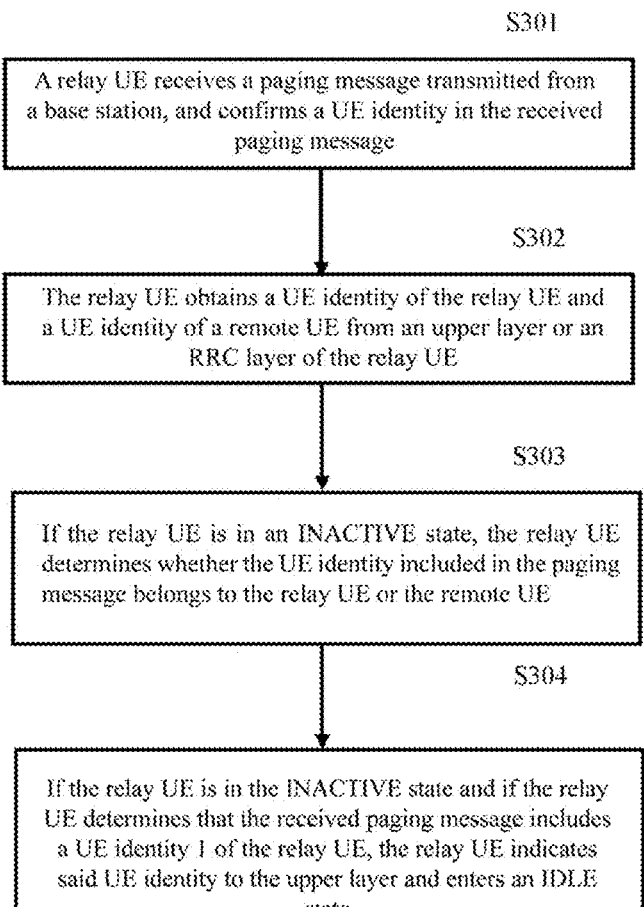

S301

A relay UE receives a paging message transmitted from a base station, and confirms a UE identity in the received paging message

S302

The relay UE obtains a UE identity of the relay UE and a UE identity of a remote UE from an upper layer or an RRC layer of the relay UE

S303

If the relay UE is in an INACTIVE state, the relay UE determines whether the UE identity included in the paging message belongs to the relay UE or the remote UE

S304

If the relay UE is in the INACTIVE state and if the relay UE determines that the received paging message includes a UE identity 1 of the relay UE, the relay UE indicates said UE identity to the upper layer and enters an IDLE state

FIG. 3

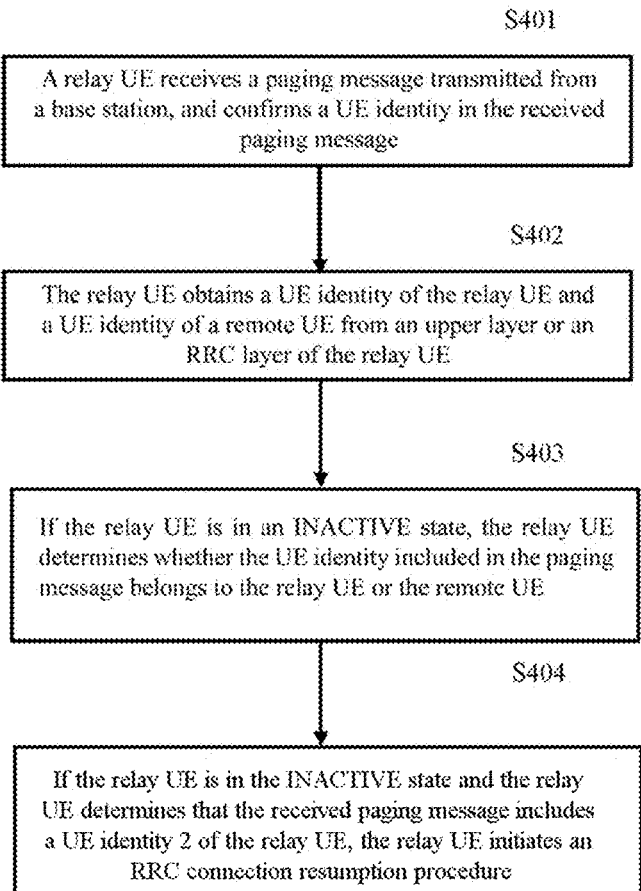

S401

A relay UE receives a paging message transmitted from
a base station, and confirms a UE identity in the received
paging message

S402

The relay UE obtains a UE identity of the relay UE and
a UE identity of a remote UE from an upper layer or an
RRC layer of the relay UE

S403

If the relay UE is in an INACTIVE state, the relay UE
determines whether the UE identity included in the paging
message belongs to the relay UE or the remote UE

S404

If the relay UE is in the INACTIVE state and the relay
UE determines that the received paging message includes
a UE identity 2 of the relay UE, the relay UE initiates an
RRC connection resumption procedure

FIG. 4

User equipment 500

PROCESSING METHOD FOR RELAY UE AND USER EQUIPMENT

TECHNICAL FIELD

The present invention relates to the technical field of wireless communications. More specifically, the present invention relates to a processing method for a relay UE, and a corresponding base station and corresponding user equipment.

BACKGROUND

A remote UE can communicate with a base station via a relay UE. After an RRC connection between the remote UE and the base station is released, in order to ensure the reachability of the remote UE, the relay UE can, in place of the remote UE, monitor and receive a paging message transmitted by the base station.

For the received paging message, the relay UE needs to confirm whether the paging message has a UE identity belonging to the relay UE, and also needs to confirm whether the paging message has a UE identity belonging to the remote UE. Considering that a relay UE needs to confirm different UE identities, how the relay UE processes a paging message upon receiving the same is a problem to be solved.

SUMMARY

In order to solve the above problem, provided in the present invention are a processing method for a relay UE and user equipment, which can solve the problem of how to process a paging message when a relay UE receives the same.

According to one aspect of the present invention, provided is a processing method for a relay UE, where the relay UE serves a remote UE, and the processing method comprises: the relay UE receiving a paging message transmitted from a base station, and confirming a UE identity in the received paging message; the relay UE obtaining a UE identity of the remote UE from an upper layer or an RRC layer of the relay UE; the relay UE determining whether the received paging message comprises the UE identity of the remote UE; and if the paging message comprises the UE identity of the remote UE, the relay UE generating a paging indication that comprises the UE identity of the remote UE or indicates that the UE identity of the remote UE has been received.

In the foregoing processing method for a relay UE, preferably, the processing method comprises: the relay UE obtaining a UE identity of the relay UE from the upper layer or the RRC layer of the relay UE; and the relay UE determining whether the received paging message comprises the UE identity of the relay UE.

In the foregoing processing method for a relay UE, preferably, when the relay UE is in an INACTIVE state, the relay UE determines whether the UE identity comprised in the paging message belongs to the relay UE or the remote UE.

In the foregoing processing method for a relay UE, preferably, the relay UE obtains a UE identity 1 serving as a UE identity of the remote UE from the upper layer of the relay UE, the relay UE obtains a UE identity 1 serving as a UE identity of the relay UE from the upper layer of the relay UE, the relay UE obtains a UE identity 2 serving as a UE identity of the remote UE from the upper layer or the RRC layer of the relay UE, and the relay UE obtains a UE identity 2 serving as a UE identity of the relay UE from the RRC layer of the relay UE.

In the foregoing processing method for a relay UE, preferably, if the relay UE is in an IDLE state and if the relay UE determines that the received paging message comprises the UE identity 1 of the relay UE, the relay UE indicates the UE identity to the upper layer.

In the foregoing processing method for a relay UE, preferably, if the relay UE is in the INACTIVE state and if the relay UE determines that the received paging message comprises the UE identity 1 of the relay UE, the relay UE indicates the UE identity to the upper layer and enters an IDLE state, and if the relay UE is in the INACTIVE state and if the relay UE determines that the received paging message comprises the UE identity 2 of the relay UE, the relay UE initiates an RRC connection resumption procedure.

According to another aspect of the present invention, provided is user equipment, comprising: a processor; and a memory storing instructions, where the instructions, when run by the processor, perform the foregoing processing method according to any one of the above items.

According to the processing method for a relay UE and the user equipment provided in the present invention, the problem of how to process a paging message when a relay UE receives the same can be solved.

BRIEF DESCRIPTION OF THE DRAWINGS

FIG. 1 is an overall flowchart showing a processing method for a relay UE according to the present invention.

FIG. 2 is a partial processing flowchart showing a processing method for a relay UE according to the present invention when the relay UE is in an IDLE state.

FIG. 3 is a partial processing flowchart showing a processing method for a relay UE according to the present invention when the relay UE is in an INACTIVE state.

FIG. 4 is another partial processing flowchart showing a processing method for a relay UE according to the present invention when the relay UE is in an INACTIVE state.

DETAILED DESCRIPTION

Figure 5:
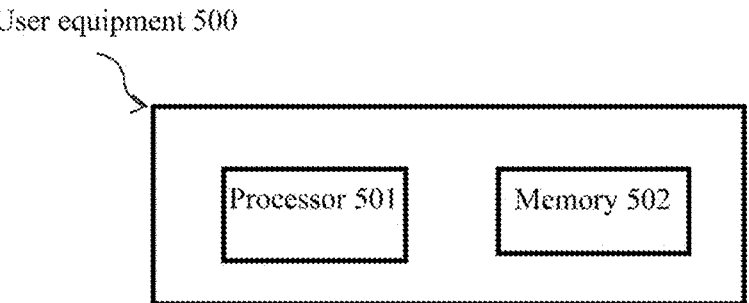
FIG. 5 is a schematic structural block diagram of user equipment according to the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
LTE: Long Term Evolution
eLTE: enhanced Long Term Evolution
RRC: Radio Resource Control (layer)
MAC: Medium Access Control (layer)
MAC CE: MAC Control Element
SDAP: Service Data Adaptation Protocol
S-TMSI: Serving Temporary Mobile Subscriber Identity
I-RNTI: Inactive Radio Network Temporary Identifier A plurality of embodiments according to the present invention are specifically described below, with an NR mobile communications system and its subsequent evolved version serving as exemplary application environments, and with a base station and UE that support NR serving as examples. However, it should be noted that the present invention is not limited to the following embodiments, but is applicable to more other wireless communication systems, such as an eLTE communication system, or an NB-IoT system, or an LTE-M system. Moreover, the present invention may be applicable to other base stations and user equipment, such as base stations and user equipment supporting eLTE/NB-IoT/LTE-M.

In NR access technology, according to the connection status of a UE over an air interface, the states of the UE can be divided into an RRC idle state (IDLE), an RRC connected state, and an RRC inactive state (INACTIVE). In the RRC inactive state, although the UE has no connection over the air interface, an access stratum context (AS context) of the UE is reserved on the base station side and the UE side, and the UE is assigned an I-RNTI, which is used by the UE to resume an RRC connection. This intermediate state can be considered as a connection suspended state, or it can be considered as a connection inactive state.

A UE can have two UE identities according to the RRC state thereof:

UE identity 1: When the UE is in the RRC IDLE state, an upper layer of the UE, mainly a non-access stratum, will indicate a UE identity 1 to an RRC layer of the UE. The RRC layer can determine, according to the identity, whether the UE is paged by a network side. Typically, a core network will trigger a paging message that uses the UE identity 1 as an identity thereof. For example, when the UE receives a paging message, the UE confirms whether the received paging message includes the UE identity 1 indicated by the upper layer. If so, the UE indicates this UE identity to the upper layer. Correspondingly, the upper layer can trigger the UE to initiate a connection establishment procedure. In the present application, an S-TMSI is used as an example of the UE identity 1 indicated to the UE by the upper layer. However, the UE identity 1 is not limited to the S-TMSI, and may also be other identities.

UE identity 2: When the UE is in the RRC INACTIVE state, the RRC layer of the UE stores a UE identity 2. The RRC layer can determine, according to the identity, whether the UE is paged by a network side. Typically, an access network will trigger a paging message that uses the UE identity 2 as an identity thereof. For example, when the UE receives a paging message, the UE confirms whether the received paging message includes the UE identity 2 stored by the UE itself. If so, the UE will initiate an RRC connection resumption procedure. In the present application, an I-RINT is used as an example of the UE identity 2 stored in the RRC layer of the UE. However, the UE identity 2 is not limited to the I-RNTI, and may also be other identities.

In a special case, if the UE is in the INACTIVE state, and if the received paging message includes a UE identity 1 indicated by the upper layer, such as an S-TMIS, then the UE indicates the UE identity S-TMIS to the upper layer, and then enters the RRC idle state.

When a UE acts as a relay UE, a remote UE served thereby may be in the RRC IDLE state or the RRC INACTIVE state. A UE identity used to page the remote UE may be the aforementioned UE identity 1 (such as the S-TMIS) or the aforementioned UE identity 2 (such as the I-RNTI).

The relay UE needs to monitor and receive a paging message for the remote UE, and needs to confirm whether the received paging message includes a UE identity belonging to the remote UE.

The problem to be solved first is how the relay UE obtains the UE identity of the remote UE. Herein, one relay UE serving one remote UE is used as an example. In practical applications, one relay UE can simultaneously serve multiple remote UEs. The serving herein means that there is a wireless connection between the relay UE and the remote UE, such as a sidelink (also referred to as PC5) connection, or means that the relay UE monitors the paging message belonging to the remote UE for the remote UE.

With reference to FIG. 1 to FIG. 4, the processing flow of a processing method for a relay UE according to the present invention is given below.

FIG. 1 is an overall flowchart showing a processing method for a relay UE according to the present invention.

In step S101, a relay UE receives a paging message transmitted from a base station, and confirms a UE identity in the received paging message.

In step S102, the relay UE obtains a UE identity of a remote UE from an upper layer or an RRC layer of the relay UE.

In step S103, the relay UE determines whether the received paging message includes the UE identity of the remote UE.

In step S104, if the paging message includes the UE identity of the remote UE, the relay UE generates a paging indication that includes the UE identity of the remote UE or indicates that the UE identity of the remote UE has been received.

FIG. 2 is a partial processing flowchart showing a processing method for a relay UE according to the present invention when the relay UE is in an IDLE state.

In step S201, a relay UE receives a paging message transmitted from a base station, and confirms a UE identity in the received paging message.

In step S202, the relay UE obtains a UE identity of the relay UE and a UE identity of a remote UE from an upper layer or an RRC layer of the relay UE.

In step S203, the relay UE determines whether the received paging message includes the UE identity of the relay UE and the UE identity of the remote UE.

In step S204, if the relay UE is in an IDLE state and if the relay UE determines that the received paging message includes a UE identity 1 of the relay UE, the relay UE indicates said UE identity to the upper layer.

FIG. 3 is a partial processing flowchart showing a processing method for a relay UE according to the present invention when the relay UE is in an INACTIVE state.

In step S301, a relay UE receives a paging message transmitted from a base station, and confirms a UE identity in the received paging message.

In step S302, the relay UE obtains a UE identity of the relay UE and a UE identity of a remote UE from an upper layer or an RRC layer of the relay UE.

In step S303, if the relay UE is in an INACTIVE state, the relay UE determines whether the UE identity included in the paging message belongs to the relay UE or the remote UE.

In step S304, if the relay UE is in the INACTIVE state and if the relay UE determines that the received paging message includes a UE identity 1 of the relay UE, the relay UE indicates said UE identity to the upper layer and enters an IDLE state.

FIG. 4 is another partial flowchart showing a processing method for a relay UE according to the present invention when the relay UE is in an INACTIVE state.

In step S401, a relay UE receives a paging message transmitted from a base station, and confirms a UE identity in the received paging message.

In step S402, the relay UE obtains a UE identity of the relay UE and a UE identity of a remote UE from an upper layer or an RRC layer of the relay UE.

In step S403, if the relay UE is in an INACTIVE state, the relay UE determines whether the UE identity included in the paging message belongs to the relay UE or the remote UE.

In step S404, if the relay UE is in the INACTIVE state and if the relay UE determines that the received paging message includes a UE identity 2 of the relay UE, the relay UE initiates an RRC connection resumption procedure.

The relay UE obtains a UE identity 1 serving as a UE identity of the remote UE from the upper layer of the relay UE, obtains a UE identity 1 serving as a UE identity of the relay UE from the upper layer of the relay UE, obtains a UE identity 2 serving as a UE identity of the remote UE from the upper layer or the RRC layer of the relay UE, and obtains a UE identity 2 serving as a UE identity of the relay UE from the RRC layer of the relay UE.

In the following, according to the way in which a relay UE obtains a UE identity, Embodiment 1 and Embodiment 2 are given below to specifically describe the processing performed by the relay UE upon receiving a paging message.

In addition, an S-TMIS is used as an example of the UE identity 1, and an I-RNTI is used as an example of the UE identity 2. However, as mentioned above, the UE identity 1 is not limited to the S-TMIS, and the UE identity 2 is also not limited to the I-RNTI.

Embodiment 1

In one scenario, an identity 1 of a remote UE or a UE identity 2 of the remote UE obtained by a relay UE is indicated by an upper layer of the relay UE. It may be that the upper layer of the relay UE indicates an S-TMSI or an I-RNTI of the remote UE to the relay UE.

According to the status of the relay UE, a received paging message can be processed in the following manners:
Scenario 1.1: The Relay UE is in an RRC IDLE State.

In this scenario, the upper layer of the relay UE indicates two UE identities, in which one UE identity is used to identify the relay UE, and the other UE identity is used to identify the remote UE. The UE identity identifying the relay UE is an S-TMIS, and the UE identity identifying the remote UE may be an S-TMIS or an I-RNTI.

In this case, when the relay UE receives the paging message and confirms that the paging message includes a UE identity indicated thereto by the upper layer, the relay UE indicates the UE identity included in the paging message to the upper layer.

For example: the upper layer of the relay UE indicates two UE identities, i.e., a UE identity A and a UE identity B. The RRC layer might not distinguish which UE identity belongs to the relay UE and which UE identity belongs to the remote UE.

In this case, when the relay UE receives the paging message and confirms that the paging message includes an identity C indicated to the relay UE itself, the relay UE indicates the identity C to the upper layer. This acknowledgment operation is preferably performed at the RRC layer.
Scenario 1.2: The Relay UE is in an RRC INACTIVE State.

In this scenario, the upper layer of the relay UE indicates two UE identities, in which one UE identity is used to identify the relay UE, and the other UE identity is used to identify the remote UE. The UE identity identifying the relay UE may be an S-TMIS, and the UE identity identifying the remote UE may be an S-TMIS or an I-RNTI. At the same time, the RRC of the relay UE stores an I-RNTI of the relay UE itself.

In this case, when the relay UE receives the paging message and confirms that the paging message includes a UE identity indicated thereto by the upper layer, the relay UE can indicate the UE identity to the upper layer. Then the relay UE further determines whether the UE identity included in the paging message belongs to the relay UE itself or to the remote UE.

For example, the upper layer of the relay UE indicates two UE identities, i.e., an identity A and an identity B. The identity A, such as an S-TMIS, is used to identify the relay UE, and the identity B, such as an S-TMIS or an I-RNTI, is used to identify the remote UE. In addition, the RRC layer of the relay UE may further store an identity C of the relay UE, such as an I-RNTI.

After receiving the paging message, the relay UE confirms whether the paging message includes an identity D indicated to the relay UE itself. If the paging message includes the identity D indicated to the relay UE itself, then the relay UE indicates the identity D to the upper layer. This acknowledgment operation is preferably performed at the RRC layer. Next, the relay UE determines whether the identity D belongs to the relay UE or to the remote UE. This identity determination operation is preferably performed at the RRC layer. In order to enable the RRC layer to perform the operation of identity ownership determination, when the upper layer indicates the identities to the RRC layer, the ownerships of the identities should be explicitly or implicitly indicated at the same time, for example, the identity A is used to identify the relay UE, and the identity B is used to identify the remote UE.

If the identify D belongs to the relay UE (in other words, does not belong to the remote UE), then the relay UE enters the IDLE state. For example, if the identity D is the same as the identity A, then the relay UE enters the RRC IDLE state.

If the identity D belongs to the remote UE (in other words, does not belong to the relay UE), then the relay UE can remain in the RRC INACTIVE state. Preferably, the relay UE may indicate the UE identity to an adaptation layer of the relay UE, and the adaptation layer generates a paging indication, and transmits the paging indication to the remote UE via a connection between the relay UE and the remote UE, such as a PC5 connection. For example, if the identity D is the same as the identity B, the relay UE remains in the RRC INACTIVE state without requiring an RRC status change. The relay UE may indicate the identity D (i.e., the identity B) to the adaptation layer of the relay UE, and based on the indicated identity, the relay UE may generate a paging indication at the adaptation layer.

Embodiment 2

In another scenario, a UE identity 1 of a remote UE obtained by a relay UE is indicated by an upper layer of the relay UE. It may be that the upper layer of the relay UE indicates an S-TMSI of the remote UE to the relay UE. A UE identity 2 of the remote UE is stored in an RRC layer of the relay UE. Herein, the UE identity of the remote UE may be an I-RNTI.

According to the status of the relay UE, a received paging message can be processed in the following manners:

Scenario 2.1: The Relay UE is in an RRC IDLE State.

In this scenario, the upper layer of the relay UE indicates two UE identities, in which one UE identity is used to identify the relay UE, and the other UE identity is used to identify the remote UE, or only one UE identity is indicated to identify the relay UE. In addition, the RRC layer of the relay UE further stores the I-RNTI of the remote UE.

The I-RNTI of the remote UE stored by the RRC layer of the relay UE may be transmitted by the remote UE to the relay UE through a message, or included in an adaptation layer and transmitted to the relay UE, and then stored by the relay UE.

In this case, when the relay UE receives a paging message and confirms that the paging message includes a UE identity indicated thereto by the upper layer, the relay UE indicates the UE identity to the upper layer. Specific operations are as described in scenario 1.1 of Embodiment 1.

When the relay UE receives the paging message and confirms that the paging message includes an I-RNTI identifying the remote UE and stored by the RRC layer of the relay UE, the relay UE can indicate the UE identity I-RNTI to the upper layer, or indicate the UE identity I-RNTI to a lower layer, such as a relay adaptation layer. A paging indication is generated by the adaptation layer and transmitted to the remote UE through a connection between the relay UE and the remote UE, such as a PC5 connection. Alternatively, the paging indication is delivered to a PC5 RRC layer, and the PC5 RRC layer triggers generation of a message including the paging indication, and transmits the message to the remote UE.

Scenario 2.2: The Relay UE is in an RRC INACTIVE State.

In this scenario, the upper layer of the relay UE may indicate two UE identities 1 to the RRC layer of the relay UE, in which one UE identity 1 is used to identify the relay UE, and the other UE identity 1 is used to identify the remote UE, or only one UE identity 1 is indicated to identify the relay UE. In addition, the RRC of the UE further stores a UE identity 2 (for example, an I-RNTI) identifying the relay UE itself and a UE identity 2 identifying the remote UE.

As mentioned above, the I-RNTI of the remote UE stored by the RRC layer of the relay UE may be transmitted by the remote UE to the relay UE through a message, or included in an adaptation layer and transmitted to the relay UE, and then stored by the relay UE.

In this case, when the relay UE receives the paging message and confirms that the paging message includes the UE identity 2 stored by the RRC of the relay UE, such as an I-RNTI, the relay UE needs to distinguish whether the I-RNTI is used to identify the relay UE or to identify the remote UE.

If the confirmed I-RNTI included in the paging message belongs to the remote UE or is associated with the remote UE, then the relay UE can indicate the UE identity I-RNTI to the upper layer, or indicate the UE identity I-RNTI to a lower layer, such as an adaptation layer of the relay UE. A paging indication is generated by the adaptation layer, and is transmitted to the remote UE through a connection between the relay UE and the remote UE, such as a PC5 connection. Alternatively, the paging indication is delivered to a PC5 RRC layer, and the PC5 RRC layer triggers generation of a message including the paging indication, and transmits the message to the remote UE.

If the confirmed I-RNTI included in the paging message belongs to the relay UE, then the relay UE initiates an RRC connection resumption procedure.

Preferably, the above process is performed at the RRC layer of the relay UE.

The following describes specific processes performed by the relay UE and the remote UE when the S-TMSI identifying the remote UE and the I-RNTI identifying the remote UE are acquired at the relay UE side in Embodiment 1 or Embodiment 2. The acquisition method is not limited to indicating the identity by the upper layer of the relay UE, or storing the identity at the RRC layer of the relay UE.

When the relay UE confirms that the paging message includes the S-TMSI identifying the remote UE, the relay UE, when generating the paging indication, includes the S-TMIS in indication information, or indicates, in the indication information, that a paging using the S-TMSI to identify the remote UE has been received.

When the relay UE confirms that the paging message includes the I-RNTI identifying the remote UE, the relay UE, when generating the paging indication, needs to include the I-RNTI in indication information, or indicates, in the indication information, that a paging using the I-RNTI to identify the remote UE has been received.

Based on the received paging indication, for the remote UE in the IDLE state, if the indication information indicates that a paging using the S-TMSI to identify the remote UE has been received, then the remote UE indicates this information to an upper layer. For the remote UE in the INACTIVE state, if the indication information includes the S-TMIS, then the remote UE indicates the identity to an upper layer of the remote UE, and then enters the IDLE state; if the indication information includes the I-RNTI or indicates that a paging using the I-RNTI to identify the remote UE has been received, then when the I-RNTI is stored in an RRC layer of the remote UE, the remote UE can initiate an RRC connection resumption procedure.

Specifically, it may be that a PC5 RRC message received by the remote UE from the relay UE includes the paging indication, and the paging indication contains the UE identity, and such paging indication is delivered to the RRC layer of the remote UE.

When the remote UE is in the IDLE state, the RRC layer of the remote UE indicates the UE identity in the paging indication to the upper layer.

When the remote UE is in the INACTIVE state, the remote UE determines whether the UE identity in the paging indication is an S-TMIS or an I-RNTI. If the UE identity is an I-RNTI, then the remote UE can initiate an RRC connection resumption procedure; if the UE identity is an S-TMIS, then the remote UE indicates the UE identity to the upper layer, and then the remote UE enters the IDLE state.

FIG. 5 is a schematic structural block diagram of user equipment according to the present invention.

As shown in FIG. 5, user equipment 500 at least includes a processor 501 and a memory 502. The processor 501 may include, for example, a microprocessor, a microcontroller, an embedded processor, and the like. The memory 502 may include, for example, a volatile memory (for example, a random access memory (RAM)), a hard disk drive (HDD), a non-volatile memory (for example, a flash memory), or other memory systems. The memory 502 stores program instructions. When the instructions are executed by the processor 501, one or several steps in the processing method for a relay UE described above in FIG. 1 to FIG. 4 of the present disclosure can be implemented.

The methods and related devices according to the present disclosure have been described above in conjunction with preferred embodiments. It should be understood by those skilled in the art that the methods shown above are only exemplary, and the above embodiments can be combined with one another as long as no contradiction arises. The methods of the present invention are not limited to the steps or sequences illustrated above.

The user equipment shown above may include more modules, for example, may also include modules that can be developed or developed in the future and can be used for base stations, MMEs, or UE, and so on. Various identifiers shown above are only exemplary, not for limitation, and the present disclosure is not limited to specific information elements serving as examples of these identifiers. A person skilled in the art could make various alterations and modifications according to the teachings of the illustrated embodiments.

It should be understood that the above embodiments of the present disclosure may be implemented through software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. User equipment (UE), comprising:
a processor; and
a memory in electronic communication with the processor, wherein instructions stored in the memory are executable to:
receive, from another UE, a message via a sidelink connection, wherein the message includes a paging indication containing an UE identity of the UE;
determine that the UE is in an inactive state;
determine whether the UE identity in the paging indication is a first type of UE identity indicated from a higher layer that is higher than a radio resource control (RRC) layer, or a second type of UE identity stored in the RRC layer;
in response to determining that the UE identity is the first type of UE identity, provide an indication of the UE identity to the higher layer; and
in response to determining that the UE identity is the second type of UE identity, initiate an RRC resumption procedure.

2. User equipment (UE), comprising:
a processor; and
a memory in electronic communication with the processor, wherein instructions stored in the memory are executable to:
receive, from a base station, a paging message including a UE identity;
determine that the UE identity included in the paging message is the same with a UE identity of a remote UE; and
initiate a transmission of a message to the remote UE via a sidelink connection, wherein the message includes a paging indication containing the UE identity of the remote UE, such that, by transmitting the message to the remote UE, the remote UE is caused to:
determine whether the UE identity in the paging indication is a first type of UE identity indicated from a higher layer that is higher than a radio resource control (RRC) layer or a second type of UE identity stored in the RRC layer;

in response to determining that the UE identity is the first type of UE identity, provide an indication of the UE identity to the higher layer; and in response to determining that the UE identity is the second type of UE identity, initiate an RRC resumption procedure.

3. A processing method for user equipment (UE), comprising:

receiving, from another UE, a message via a sidelink connection, wherein the message includes a paging indication containing an UE identity of the UE;

determining that the UE is in an inactive state;

determining whether the UE identity in the paging indication is a first type of UE identity indicated from a higher layer that is higher than a radio resource control (RRC) layer, or a second type of UE identity stored in the RRC layer;

in response to determining that the UE identity is the first type of UE identity, providing an indication of the UE identity to the higher layer, and in response to determining that the UE identity is the second type of UE identity, initiating an RRC resumption procedure.

* * * * *